United States Patent
Junker et al.

(10) Patent No.: US 6,767,050 B2
(45) Date of Patent: Jul. 27, 2004

(54) PASSENGER COMPARTMENT ISOLATOR SYSTEM FOR AUTOMOTIVE VEHICLE

(75) Inventors: Christian Junker, Kentwood, MI (US); William Michael Cook, Canton, MI (US); Tarun Kumar Bhatt, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 3 days.

(21) Appl. No.: 10/248,084

(22) Filed: Dec. 17, 2002

(65) Prior Publication Data

US 2004/0113460 A1 Jun. 17, 2004

(51) Int. Cl.[7] .............................................. B60K 37/00
(52) U.S. Cl. .................. 296/193.02; 296/70; 296/39.3; 180/90
(58) Field of Search ........................ 296/39.3, 19, 3.02, 296/203.02, 192, 70, 72, 193.62; 180/90

(56) References Cited

U.S. PATENT DOCUMENTS

| | | | |
|---|---|---|---|
| 4,263,247 A | | 4/1981 | Berger et al. |
| 4,591,202 A | | 5/1986 | Burk et al. |
| 4,655,496 A | | 4/1987 | Gahlau et al. |
| 4,909,566 A | | 3/1990 | Hashimoto et al. |
| 5,005,898 A | * | 4/1991 | Benedetto et al. .......... 296/194 |
| 5,082,078 A | * | 1/1992 | Umeda et al. ................ 296/70 |
| 5,234,246 A | * | 8/1993 | Henigue et al. .............. 296/70 |
| 5,358,300 A | * | 10/1994 | Gray .......................... 296/192 |
| 5,527,581 A | | 6/1996 | Sugawara et al. |
| 5,557,078 A | | 9/1996 | Holwerda |
| 5,707,100 A | * | 1/1998 | Suyama et al. ............. 296/192 |
| 5,817,408 A | * | 10/1998 | Orimo et al. ............... 296/39.3 |
| 5,823,602 A | * | 10/1998 | Kelman et al. ............... 296/70 |
| 6,189,957 B1 | | 2/2001 | Matsui et al. |
| 6,322,440 B1 | * | 11/2001 | Nakatani ..................... 296/192 |
| 6,371,551 B1 | * | 4/2002 | Hedderly ..................... 296/192 |
| 6,435,603 B1 | * | 8/2002 | Ohmura et al. ............. 296/194 |
| 6,561,563 B2 | * | 5/2003 | Okana et al. .................. 296/70 |
| 6,601,902 B1 | * | 8/2003 | Rahmstorf et al. ........... 296/70 |

* cited by examiner

*Primary Examiner*—D. Glenn Dayoan
*Assistant Examiner*—Greg Blankenship
(74) *Attorney, Agent, or Firm*—Gigette M. Bejin

(57) ABSTRACT

A passenger compartment isolator system interposed between the engine compartment and passenger compartment of an automotive vehicle includes a dash panel having generally vertical and horizontal portions extending under the leading edge of the vehicle's windshield, and an isolator panel affixed to the horizontal and vertical portions of the dash panel on the engine compartment side of the dash panel.

18 Claims, 5 Drawing Sheets

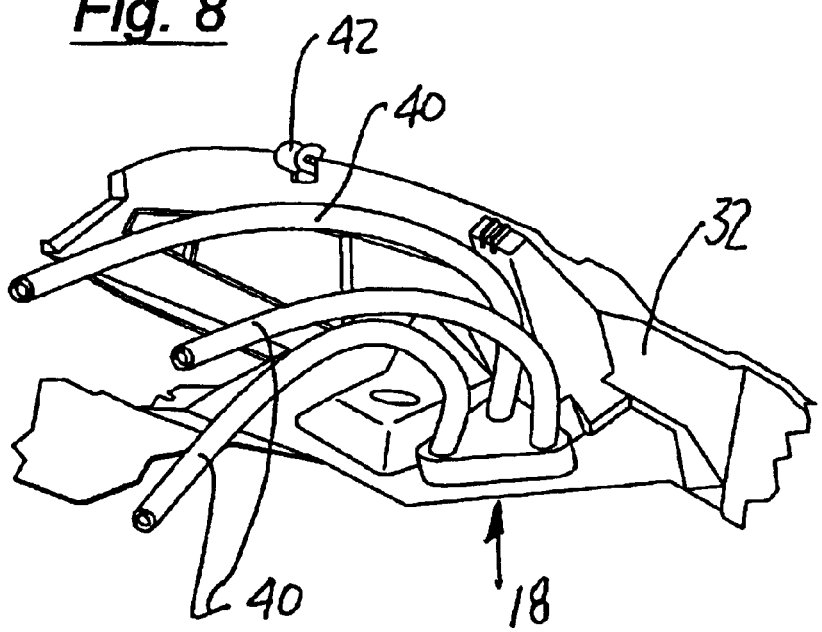

PASSENGER COMPARTMENT ISOLATOR SYSTEM FOR AUTOMOTIVE VEHICLE

BACKGROUND OF INVENTION

1. Field of the Invention

The present invention relates to an isolator system interposed between the engine and passenger compartments of an automotive vehicle so as to reduce the transmission of unwanted noise and vibration from the engine compartment and into the passenger compartment.

2. Disclosure Information

As luxury passenger cars have become increasingly quieter within the passenger compartment, or cabin, it has become necessary to develop new structures, methods and materials for isolating noise vibration and harshness (NVH) originating from within the engine compartment of the vehicle. In response to the need to reduce structure borne noise by limiting paths for the transmission of noise between the engine compartment and the passenger compartment, vehicle manufacturers have gravitated to solutions which, although effective, are quite costly. Thus, for example, it is known to use a second metallic dash panel in combination with a first metallic panel so as to decouple the passenger compartment from the engine compartment. Unfortunately, this is a very expensive solution to the problem. Moreover, the problem is exacerbated when the vehicle is of the cab forward design in which the engine compartment is in fact tucked under the leading edge of the windshield. This detrimental result arises from the fact that automotive bodies having cab forward designs have cowl structures with both vertical and horizontal surfaces which function to radiate noise into the vehicle passenger compartment.

A system according to the present invention provides a cost effective means for reducing structure borne noise as well as airborne noise transmitted from the engine compartment to the passenger compartment or a vehicle.

SUMMARY OF INVENTION

A passenger compartment isolator system interposed between the engine compartment and passenger compartment of an automotive vehicle includes a dash panel having a first portion extending generally vertically from a toeboard area of the passenger compartment floor to a position rearward of the leading edge of the vehicle's windshield, and a second portion extending generally horizontally from the upper end of said first portion to a position underlying the leading edge of the windshield. An isolator panel affixed to the engine compartment side of the dash panel has a first portion applied to the generally vertical portion of the dash panel and a second portion applied to and depending from a generally horizontal portion of the dash panel.

An isolator panel according to one aspect of the present invention preferably comprises a unitary composite of elastomer bonded to a relatively more rigid plastics material. More specifically, the isolator panel may comprise a composite of cast foam bonded to a molded sheet such as thermoplastic olefin. In such case, the isolator panel will be positioned such that the cast foam is interposed between the dash panel and the molded sheet. The isolator panel may further comprise an air intake duct extending generally toward the engine compartment and away from the passenger compartment with the duct having an aperture in an upper surface for conducting air from a cowl area of the vehicle and into the passenger compartment.

It is an advantage of the present invention that an isolator system according to this invention will greatly reduce the ingress of NVH from the engine compartment and into the passenger compartment of an engine-equipped vehicle.

Another advantage of the present invention is that an isolator system according to this invention will produce superior NVH reduction in the passenger compartment without the high cost attendant a separate steel or other metallic panel applied in addition to the dash panel.

Other advantages, as well as objects and features of the present invention, will become apparent to the reader of this specification.

BRIEF DESCRIPTION OF DRAWINGS

FIGS. 6–8 illustrate various additional structural aspects of a passenger compartment isolator according to the present invention.

DETAILED DESCRIPTION

Figure 1:
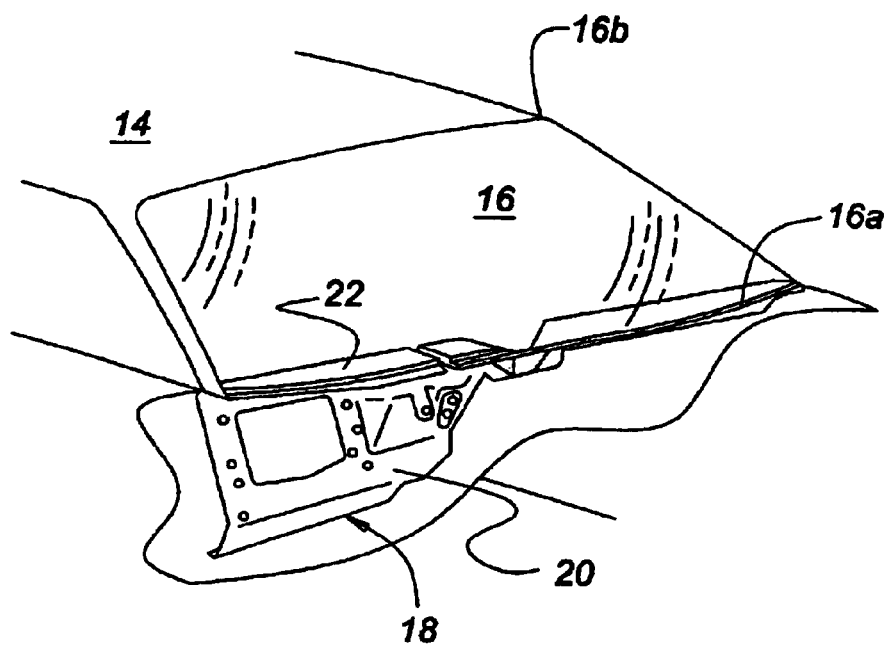
FIG. 1 is a schematic perspective view of a portion of an automotive vehicle having a passenger compartment isolator system according to the present invention.
Figure 2:
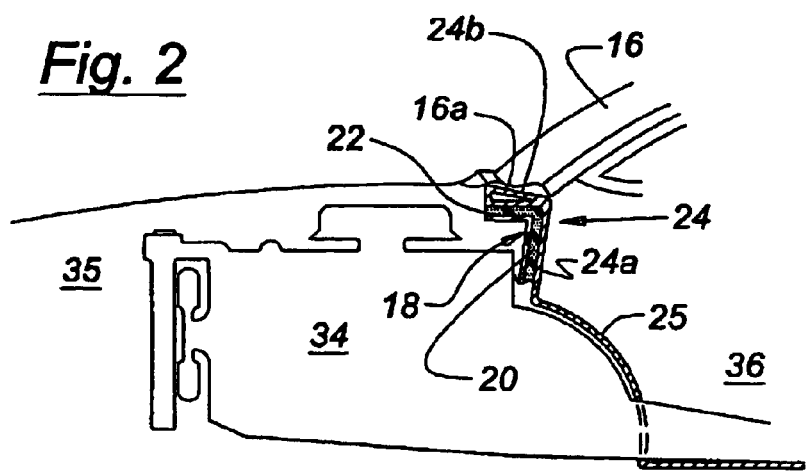
FIG. 2 is a side view of a vehicle having a passenger compartment isolator system according to the present invention.

As shown in FIG. 1, an automotive vehicle having a roof 14 and windshield 16 is of the cab forward design. This cab forward feature is shown with greater particularity in FIG. 2, wherein it is seen that engine 34 is situated or tucked under the leading edge 16a of windshield 16. In the absence of an isolator system according to the present invention, noise emanating from the engine compartment, particularly from engine 34, may easily find its way into the passenger compartment through dash panel 24. In cab-forward fashion, dash panel 24 has a generally vertical first portion 24a which extends from the toeboard area 25 of the vehicle floor area. Dash panel 24 also has second portion 24b which extends generally horizontally from the upper end of portion 24a. Portion 24b of dash panel 24 generally extends forwardly to a position underlying leading edge 16a of windshield 16.

Isolator panel 18 is configured as generally shown in FIG. 1. It is noted from FIGS. 1 and 2 that isolator panel 18 is fixed to the engine compartment side of dash panel 24. Isolator panel 18 has vertical section 20, which is applied to the generally vertical portion 24a of dash panel 24. Isolator panel 18 also has a generally horizontal portion 22 which is applied to the generally horizontal portion 24b of dash panel 24.

Those skilled in the art will appreciate in view of this disclosure that dash panel 24 in the region of generally horizontal section 24b may comprise a box of regular or irregular shape or other type of structure intended to provide the needed rigidity for a beam-like structure extending across substantially the entire width of the vehicle body. Alternatively, section 24b may comprise a single thickness of sheet metal or another single thickness sheet of structural material. In any event, isolator panel 18 prevents the ingress of noise arising from the engine compartment 35 into passenger compartment 36 of the vehicle.

Figure 3:
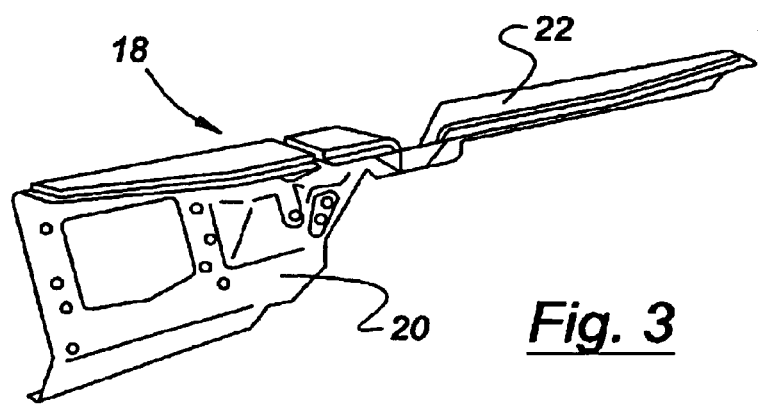
FIG. 3 is a perspective view of a passenger compartment isolator panel according to the present invention.

FIG. 3 illustrates absorber isolator panel 18 in greater detail. It is noted that the panel is contoured in portions 20 and 22 to generally fit dash panel 24 very closely so as to eliminate paths for airborne noise to be transmitted from engine compartment 35 into passenger compartment 36.

Figure 5:
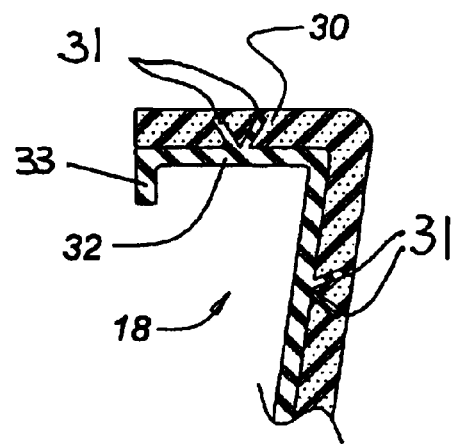
FIG. 5 is a section at the mid-point of an isolator panel along the line 5—5 of FIG. 3.

FIG. 5 illustrates one preferred type of construction of isolator panel 18. According to the illustrated construction, isolator panel 18 comprises a composite of elastomer 30 such as molded or cast foam, bonded to molded sheet 32 which may comprise for example, thermoplastic olefin. Isolator panel 18 is positioned such that cast or molded foam 30 is interposed between dash panel 24 and molded sheet 32. Because thermoplastic olefin 32 is more rigid than foam 30, the olefin functions not only to carry foam 30 but also as a stiff barrier to noise and vibration. Foam 30 performs its function by damping noise and vibration. A plurality of V-shaped retention tabs 31 is molded into sheet 32. Each of tabs 31 extends through foam 30, for the purpose of maintaining foam 30 in contact with molded sheet 32.

Figure 6:
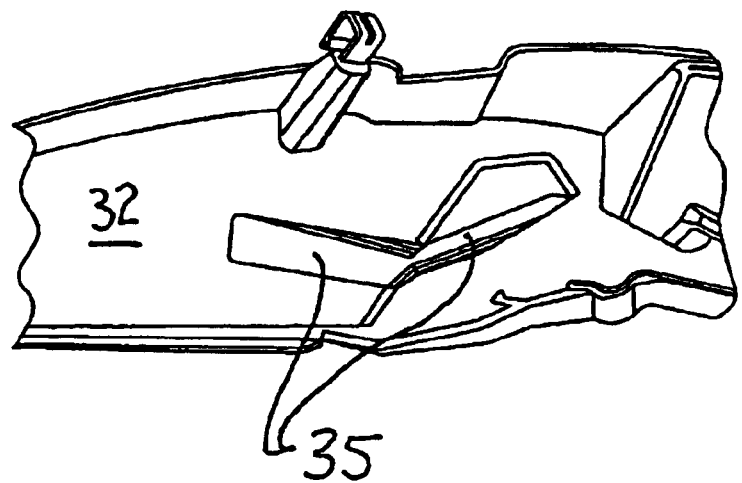
Figure 7:
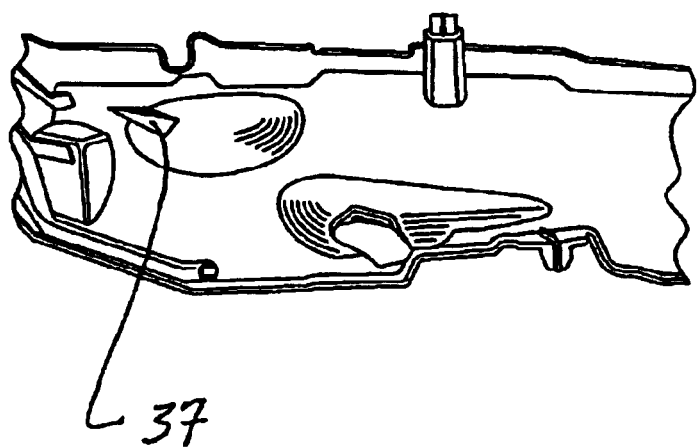

Stiffness is an important attribute of molded sheet 32. The inherent stiffness may be enhanced by providing various structural features which are illustrated in FIGS. 5, 6, and 7. For example, in FIG. 5, depending flange 33, which extends from the leading edge of molded sheet 32, provides structural stiffness to sheet 32. In FIG. 6, molded rib 35 stiffens sheet 32 in an angular area of transition from a first plane to a second plane. Finally, in FIG. 7, molded rib 37 stiffens sheet 32 in the area in which the windshield wiper motor (not shown) is installed.

Those skilled in the art will appreciate in view of this disclosure that other types of construction of isolator panel 18 may be implemented according to the present invention. For example, other types of composite materials may be employed to achieve the desired attenuation of NVH. Similarly, dash panel 24, although being shown in the form of a metal such as stamped steel or aluminum which may be welded to the body structure, may be instead itself comprise a composite dash panel. This type of construction of dash panel 24 is nevertheless amenable to treatment according to the present invention.

Figure 4:
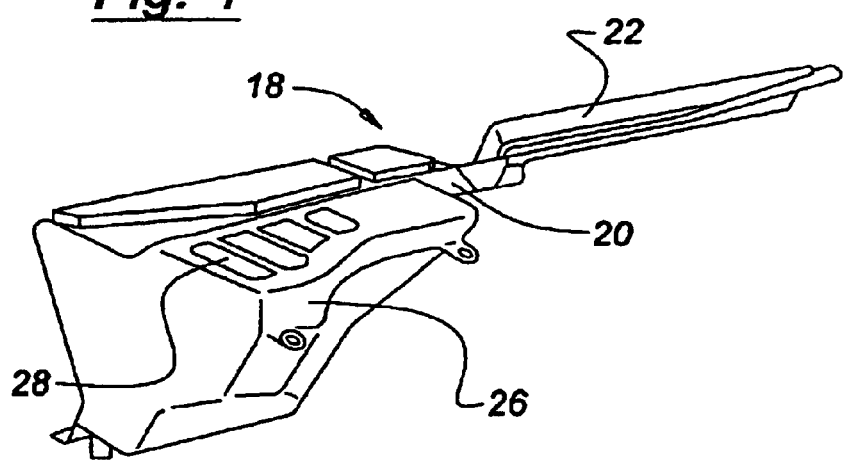
FIG. 4 is a perspective rendering of a second type of isolator panel according to present invention.

FIG. 4 illustrates a second embodiment of isolator panel 18 according to the present invention, incorporating air duct 26 having air inlet ports 28 for bringing air from outside the vehicle's cowl area into passenger compartment 36 via an air conditioning system (not shown). Air duct 26 extends generally towards engine compartment 35 and away from passenger compartment 36. The structure of FIG. 4 is advantageous because the combined isolator panel and air inlet structure may be formed of a single molded sheet of relatively more rigid plastic on the outside and molded elastomeric isolator on the inside is illustrated in FIG. 5. Because this inventive construction eliminates joints between what were formerly discrete components, one result will be superior sound isolation and a concomitant reduction in air leaks from engine compartment 35 into passenger compartment 36. The isolator panel of FIG. 4 offers a further advantage in reducing the number of parts needed to assemble the vehicle's air conditioning inlet system, thereby reducing the labor required to install the parts at a vehicle assembly plant.

FIG. 8 illustrates another embodiment of isolator panel 18 according to the present invention, incorporating a plurality of molded tubes 40 for passing fluids such as engine coolant and refrigerant between the engine compartment and the passenger compartment. The molded construction of FIG. 8 is beneficial because noise paths and air leaks associated with prior art constructions are eliminated. FIG. 8 also illustrates clip 42, which is used to attach isolator panel 18 to dash panel 24.

Although the present invention has been described in connection with particular embodiments thereof, it is to be understood that various modifications, alterations and adaptations may be made by those skilled in the art without departing from the spirit and scope of the invention. For example an isolator according to the present invention may be mounted to a vehicle's cowl region by means of clips, or threaded fasteners, or by bonding, or even by friction welding. It is intended that the invention be limited only by the appended claims.

What is claimed is:

1. A passenger compartment isolator system interposed between the engine compartment and passenger compartment of an automotive vehicle having a front windshield, with said passenger compartment isolator comprising:

a dash panel having a first portion extending generally vertically from a toeboard area to a position rearward of a leading edge of the windshield and a second portion extending generally horizontally from an upper end of said first portion to a position underlying the leading edge of the windshield; and an isolator panel affixed to the engine compartment side of said dash panel, with said isolator having a first portion applied to said generally vertical portion of the dash panel and a second portion applied to and depending from said generally horizontal portion of said dash panel, and with said isolator panel comprising a unitary composite of foam bonded to a relatively more rigid plastic material.

2. A passenger compartment isolator system according to claim 1, wherein said dash panel is formed of metal.

3. A passenger compartment isolator system according to claim 2, wherein said dash panel is welded to other components of the automotive vehicle.

4. A passenger compartment isolator system according to claim 2, wherein said dash panel comprises stamped steel.

5. A passenger compartment isolator system according to claim 2, wherein said dash panel comprises stamped aluminum.

6. A passenger compartment isolator system according to claim 1, wherein said isolator panel comprises a unitary composite of elastomer foam bonded to a relatively more rigid plastics material.

7. A passenger compartment isolator system according to claim 1, wherein said isolator panel comprises a composite of cast foam bonded to a molded sheet.

8. A passenger compartment isolator system according to claim 7, wherein said isolator panel comprises a composite of elastomeric foam bonded to thermoplastic olefin.

9. A passenger compartment isolator system according to claim 7, wherein said isolator panel is positioned such that said foam is interposed between said dash panel and said molded sheet.

10. A passenger compartment isolator system according to claim 1, wherein said isolator panel comprises a plastics composite.

11. A passenger compartment isolator system according to claim 1, wherein said isolator panel further comprises a passenger compartment air conditioning component.

12. A passenger compartment isolator system according to claim 1, wherein said isolator panel further comprises an air intake duct for conducting air from a cowl area of the vehicle and into the passenger compartment.

13. A passenger compartment isolator system according to claim 1, wherein said isolator panel further comprises an air intake duct extending generally toward the engine compartment and away from the passenger compartment, with said duct having an aperture in an upper surface for conducting air from a cowl area of the vehicle and into the passenger compartment.

14. A passenger compartment isolator system interposed between the engine compartment and passenger compartment of an automotive vehicle having a cab forward configuration, comprising:

a dash panel having a first portion extending generally vertically from a toeboard area to a position rearward of a leading edge of the windshield and a second portion extending generally horizontally from an upper end of said first portion to a position underlying the leading edge of the windshield; and an isolator panel affixed to the engine compartment side of said dash panel, with said isolator panel having a first portion applied to said generally vertical portion of the dash panel and a second portion applied to and depending from said generally horizontal portion of said dash panel, with said isolator panel comprising a composite of elastomeric foam bonded to a relatively more rigid molded sheet.

15. A passenger compartment isolator system according to claim 14, wherein said dash panel comprises a metal panel which is welded to other components of a body of said automotive vehicle.

16. A passenger compartment isolator system interposed between the engine compartment and passenger compartment of an automotive vehicle having a cab forward configuration, comprising:

a dash panel having a first portion extending generally vertically from a toeboard area to a position rearward of the leading edge of the windshield and a second portion extending generally horizontally from an upper end of said first portion to a position underlying the leading edge of the windshield; and an isolator panel affixed to the engine compartment side of said dash panel, with said isolator panel having a first portion applied to said generally vertical portion of the dash panel and a second portion applied to and depending from said generally horizontal portion of said dash panel, with said isolator panel comprising a composite of elastomeric foam bonded to a relatively more rigid molded sheet, with said second portion of said isolator panel having an integral stiffening rib depending from an edge of said molded sheet.

17. A passenger compartment isolator system according to claim 16, further comprising a stiffening rib formed in said molded sheet in an angular area of transition from a first plane to a second plane.

18. A passenger compartment isolator system according to claim 16, further comprising a plurality of v-shaped retention tabs integral with said molded sheet, with said retention tabs extending through said foam so as to retain said foam in contact with said molded sheet.

* * * * *